(No Model.)

C. GALLAND & J. B. GRANJON.
AGRICULTURAL DIGGER.

No. 537,447. Patented Apr. 16, 1895.

Witnesses

Inventors

UNITED STATES PATENT OFFICE.

CHARLES GALLAND, OF LYONS, AND JEAN BENOIT GRANJON, OF CHATONNAY, FRANCE.

AGRICULTURAL DIGGER.

SPECIFICATION forming part of Letters Patent No. 537,447, dated April 16, 1895.

Application filed December 18, 1893. Serial No. 493,902. (No model.) Patented in France March 24, 1893, No. 228,877.

*To all whom it may concern:*

Be it known that we, CHARLES GALLAND, a resident of Lyons, Department of the Rhone, and JEAN BENOIT GRANJON, a resident of Chatonnay, Department of the Isère, France, citizens of the Republic of France, have invented certain new and useful Improvements in Agricultural Diggers, (for which we have obtained Letters Patent in France, No. 228,877, dated March 24, 1893,) of which the following is a specification.

This invention has for its object an improved machine for digging and hoeing the ground, which may be called a mechanical digger.

The principle of the invention consists in the use of a cylinder provided with blades or teeth of variable form and dimensions for digging or hoeing the ground. A rotary motion being imparted to this cylinder causes the penetration of the above-named teeth or blades into the ground, to lift and turn over the soil held between these teeth or blades in a continuous manner, thus producing the automatic forward movement of the apparatus in which the cylinder is mounted; this cylinder being further combined with a series of knives passing between the teeth or blades of the cylinder and having for their object to cut and break up the clods of earth raised by the above named blades or teeth.

In order to enable this invention to be fully understood, reference will now be made to the accompanying drawings, on which—

Figure 1:
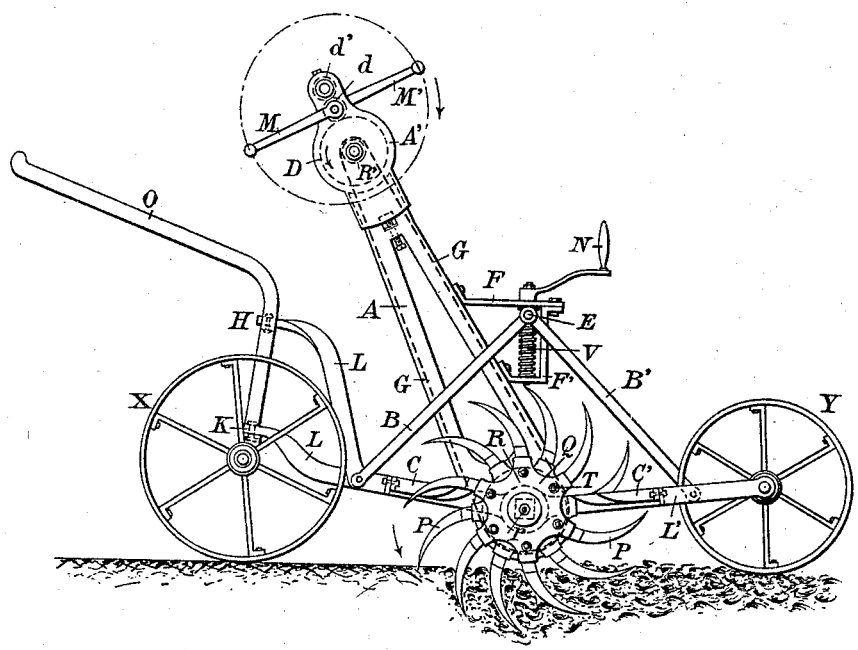
Figure 2:
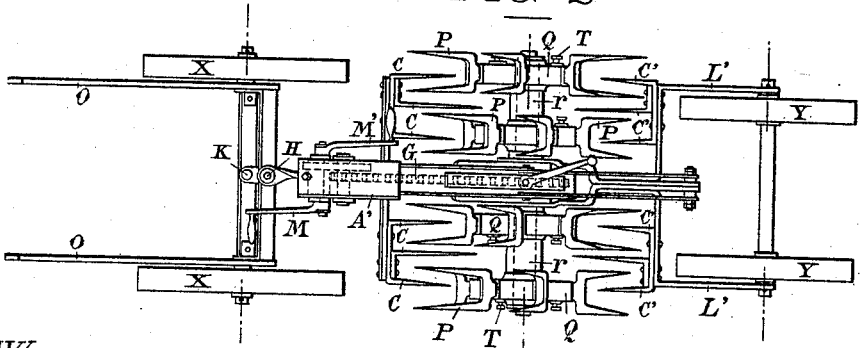

Figure 1 is a longitudinal elevation and Fig. 2 is a plan view of this improved digger.

The machine consists of a frame A, which in its lower part is traversed by a shaft $r$ carrying at its center a wheel R arranged inside the frame in order to prevent earth lodging therein. The ends of this shaft $r$ are of square section, having sockets Q fixed thereon. The diggers P, the number and shape of which are such as to yield the best results of penetration and progression, are fixed on these sockets by means of screws T. The whole of this shaft provided with its sockets and diggers P forms the digging cylinder, or simply the digging apparatus. An endless chain G, or other suitable connection, passes over the wheel R and engages at the upper part of the frame with a pinion R' which receives its motion from the cranks M and M' by means of the wheel D and pinion $d$.

In order to regulate the tension of the chain G, the pinion R' and the wheels and pinions D $d$ $d'$ are mounted in a headpiece A' arranged on the upper part of the frame A, and capable of being fixed at various distances.

The machine is carried by four wheels X and Y, the latter pair being the front ones. These wheels are arranged at the ends of the levers L and L', the other ends of which are hinged on the axle of the digging apparatus.

A device consisting of side rods B and B', connected at the bottom with the aforesaid levers L and L' and at the top with a traveling nut E, a fixed screw V and a handle N for actuating the same (the whole supported by brackets F and F' attached to the framework A), allows of the digging apparatus being raised or lowered as may be desired by means of the above named handle N. This operation serves either for regulating the depth of the digging, or for raising the digging apparatus entirely above the ground to allow of its being conveyed elsewhere.

In order to facilitate the steering of the apparatus, the rear wheels X are mounted on a movable carriage O, hinged at the points H and K on one of the aforementioned levers L arranged for this purpose as shown in Figs. 1 and 2.

On the elbowed parts of the levers L and L', knives C and C' are fixed which pass between the diggers, the object of these knives being to cut and break up the clods of earth raised by the diggers.

The arrangement shown of the diggers P and the cranks M M' compels the person operating the machines to walk backward, but on the other hand it has the advantage of avoiding any trampling down of the ground which has been dug. It is of course easy to change the direction of the movement by reversing the diggers P and shifting the cranks M and M' from the axis of the pinion $d$ to that of the pinion $d'$, an operation which may be done very quickly.

Such is the mechanical digger which is formed on the principle hereinbefore mentioned, that is to say, a traveling mechanical digging apparatus provided with knives for breaking up the earth raised by the diggers, but the arrangement, form and dimensions of the digger may of course be varied according to the depth to which it is desired to dig, or for facility of handling or for other reasons. The machine may also be used for cleaning and raking the paths of parks, gardens and the like.

We declare that what we claim is—

1. In a land cultivator, the combination of a wheeled supporting frame, a revoluble shaft carried thereby and having cutting and digging blades, and a rotary crank or driving winch mounted on said frame and having operative connection with said shaft whereby the shaft may be driven by hand to operate the blades for digging the earth and at the same time propelling the machine.

2. In a land cultivator, the crank of the carrying frame consisting of the two hinged levers L, L', the supporting wheels X, Y at the extremities thereof, the shaft $r$ carrying cutting and digging blades P and journaled on said frame the driving cranks M, M', power transmitting mechanism connecting the same to shaft $r$, a supporting frame for said cranks and power transmitting mechanism, brackets F, F' carried thereby, an adjusting screw V and adjusting side rods B, B' adapted to be operated by said screw and connected to said levers L, L' all arranged and adapted to operate substantially as set forth.

In testimony whereof we have signed our names to this specification in the presence of two subscribing witnesses.

CHARLES GALLAND.
JEAN BENOIT GRANJON.

Witnesses:
XAVIER JANICOT,
JEAN GERMAIN.